United States Patent [19]

Hoyer

[11] 3,889,901

[45] June 17, 1975

[54] COMPACT MAGNETIC TAPE DRIVE WITH OVERLAPPING TAPE REELS LYING IN DIFFERENT PLANES

[75] Inventor: Sigurd Hoyer, Glen Head, N.Y.

[73] Assignee: Potter Instrument Co., Inc., Plainview, N.Y.

[22] Filed: May 8, 1974

[21] Appl. No.: 468,192

[52] U.S. Cl. .................. 242/209; 242/68.3; 242/76; 242/182; 242/201; 242/210

[51] Int. Cl. ........................ G11b 15/28; G11b 15/58

[58] Field of Search ........... 242/209, 210, 193, 180, 242/181, 197, 198, 199, 200, 67.3, 67.4, 76, 68.3, 182, 183, 184, 185, 201, 202, 203, 204, 67.5

[56] References Cited

UNITED STATES PATENTS

| | | | |
|---|---|---|---|
| 3,114,513 | 12/1963 | Yasuda et al. | 242/210 |
| 3,140,832 | 7/1964 | Cech | 242/199 |
| 3,575,361 | 4/1971 | Wildhagen | 242/194 |

*Primary Examiner*—George F. Mautz
*Attorney, Agent, or Firm*—Alfred W. Barber

[57] ABSTRACT

Magnetic tape in computer peripheral tape handlers is passed back and forth between two large reels. Typical reels are 10½ inches in diameter. When these reels are mounted side-by-side, the minimum width of the equipment is something over 22 inches. If one reel is slightly tilted, and the second reel underlapped or overlapped with it, a space saving of up to nearly 25 percent can be effected. The tape passing to and from the tilted reel is reoriented with the rest of the system by means of two idler pulleys, one with its axis parallel with the axis of the tilted reel and the other with its axis parallel with the axis of the non-tilted reel and with the projected edge planes of the sides of the reeled tape intersecting at the edges of the tape path as it passes over one of the pulleys.

7 Claims, 8 Drawing Figures

PATENTED JUN 17 1975 3,889,901

SHEET 2

COMPACT MAGNETIC TAPE DRIVE WITH OVERLAPPING TAPE REELS LYING IN DIFFERENT PLANES

BACKGROUND OF THE INVENTION

One of the important and widely used computer peripherals is the magnetic tape handler. Many hundreds of feet of tape are stored on two reels. This tape is passed rapidly on command back and forth between the two reels and passed over recording and play-back heads located between the reels. Digital information is recorded or played-back during these passes. These reels are generally placed side-by-side near the top of a cabinet which houses the motors and control circuitry for the tape handlers. A standard size for these reels is 10½ inches in diameter so that a cabinet housing two side-by-side reels must be somewhat over 22 inches wide.

When tape handlers of the type described above were first used, the motors and control circuitry were very bulky and required large cabinets not only 20 inches wide but of substantial depth as well. Today, however, with the general use of integrated circuits, transistors and smaller motors, these very large cabinets are no longer necessary. Thus, were it not for the size of the tape reels, cabinet sizes could be substantially reduced with an attendant saving in space and cost.

SUMMARY OF THE INVENTION

In accordance with the present invention, a simple and effective change in the tape reel configuration has resulted in saving up to about 25 percent in the width of the tape reel cabinets and hence a substantial saving in space and cost of such cabinets. It has been found that if one reel is tilted slightly and the second reel is underlapped or overlapped with the first that this saving can be effected. It has been found possible to provide this space and cost saving arrangement in a simple and effective manner since in addition to tilting one of the reels and moving the reels closer together it is only necessary to provide two idler pulleys for aligning the tape path from the tilted reel to the untilted path between the two reels and onto the second reel.

IN THE DRAWING

Figure 1:
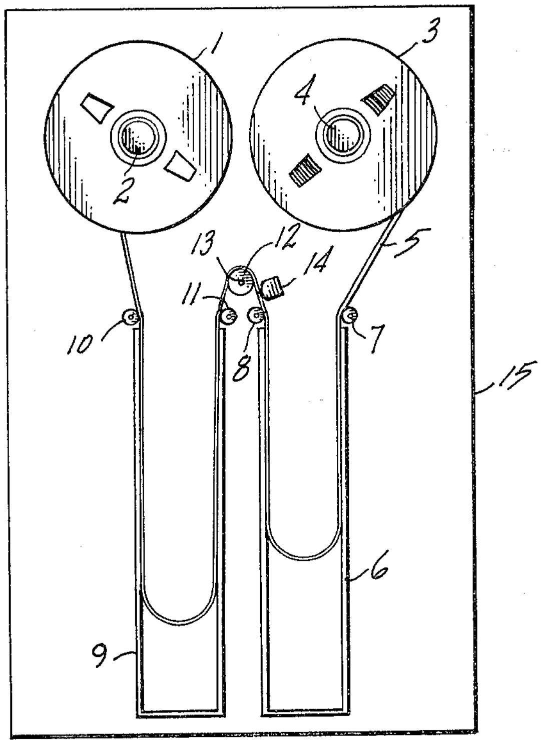
FIG. 1 PRIOR ART
FIG. 1 is a simplified elevation view of a prior art tape handler.

FIG. 1 is a simplified elevation view of a prior art tape handler. Magnetic tape 5 is passed back and forth between two large reels 1 and 3 turning on shafts 2 and 4 respectively and driven by two motors (see FIG. 3). The tape 5 is moved and controlled by a single capstan 12 turning on shaft 13 and drawn across a record/reproduce head 14 in a manner well-known to those skilled in the art. Also shown are the well-known tape tension control vacuum chambers 6 and 9 having friction reducing guide means 7, 8, 10 and 11. The complete tape handler is housed in a cabinet having outline 15.

Figure 2:
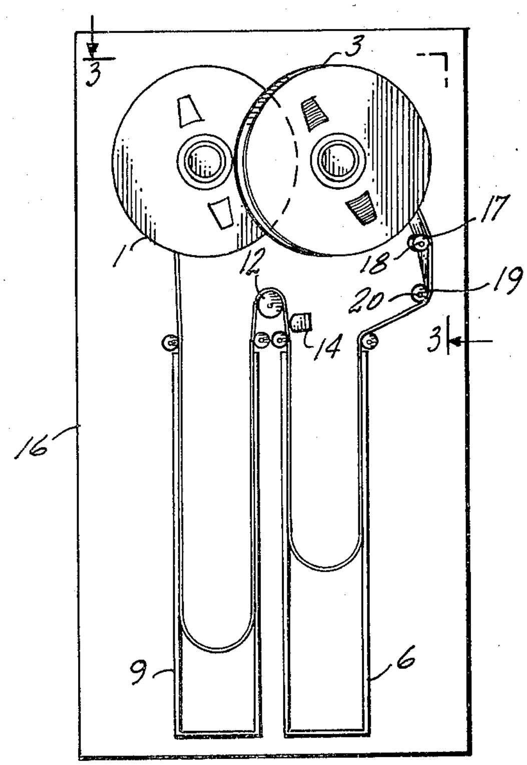
FIG. 2 is a simplified elevation view of a tape handler in accordance with one form of the present invention.

FIG. 2 is a simplified elevation view of tape reel 1 underlapping tape reel 3 in accordance with one form of the present invention. In order to interface and orient the tape so that as it leaves or enters tilted reel 1, so that it is accurately in the same plane as the tape on the reel, an idler 18 is provided having its axis parallel with the axis of reel 3. In order to interface and orient the tape over its path through the vacuum chamber 6, over capstan 12, through vacuum chamber 9 and onto reel 1 and particularly to be in the proper plane at record/reproduce head 14, a second idler pulley 20 is provided having its axis parallel to the axis of reel 1. Thus, the orientation of the tape in either direction takes place over a relatively short part between idler pulleys 18 and 20. (Details will be shown and described in connection with FIGS. 3 and 4). The effectiveness and practicality of this arrangement may not be evident or obvious due to the critical aspects of high speed tape handlers. The tape is repeatedly pulled very rapidly back and forth across the record/reproduce head. This must be accomplished with a very low level of wear on the tape or the guides and pulleys along the tape path and without undue stressing of the tape. The present invention accomplishes all of this and at the same time saves space with the use of the tilted reel.

Figure 3:
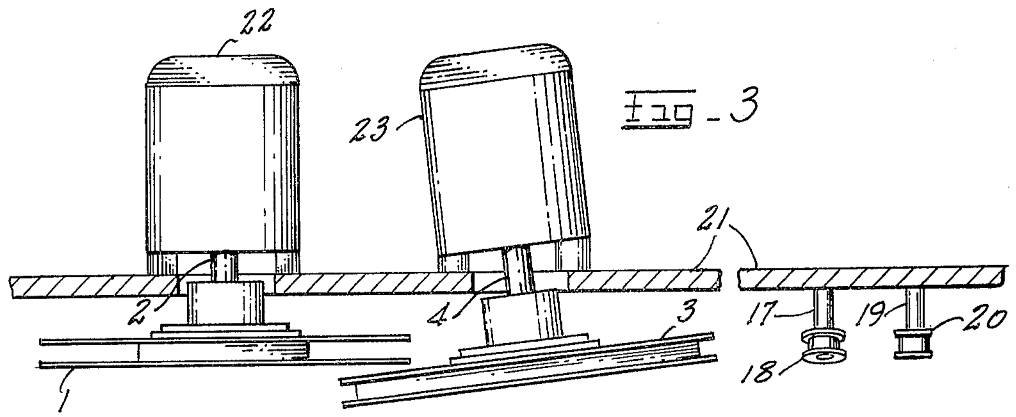
FIG. 3 is a simplified plan view of a tape handler in accordance with the present invention.

FIG. 3 is a plan view of tape reels oriented in accordance with the present invention. Reel 3 is shown tilted so that reel 1 can be underlapped by about 25 percent of its diameter. Also shown are motors 23 and 22 for driving reels 3 and 1 respectively, all mounted on a mounting plate 21. It will be seen that by tilting 3 to an even greater angle, a larger percentage of overlap and a greater saving in space and cost can be provided. The saving generally indicated in FIG. 3 is approximately 15 percent in total width and is accomplished with a tilt angle of approximately 6 degrees. With greater tilt angles, a saving approaching a maximum of 25 percent can be realized. FIG. 3 is a composite view showing reels 1 and 3 as viewed from the top looking down and idler pulleys 18 and 20 as viewed from the right side in elevation as indicated in FIG. 2.

Figure 4:
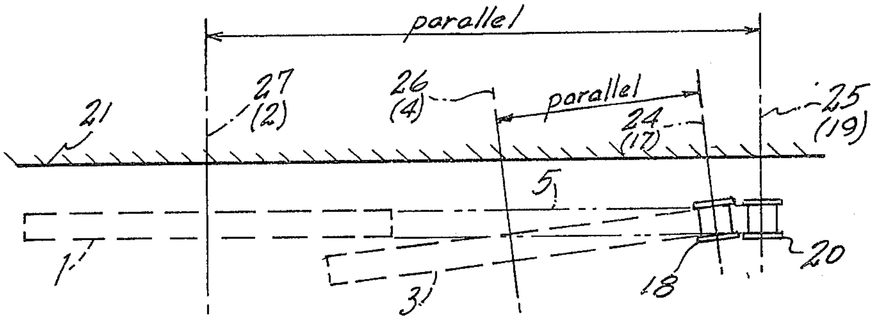
FIG. 4 is a detail of an essential part of the present invention showing how tape is guided so as to be oriented properly at the two reels.

FIG. 4 illustrates the essential conditions to be met in accordance with the present invention. The first condition is that the axis 24 of idler pulley 18 be parallel with the axis 26 of the tilted reel 3 and the axis 25 of idler pulley 20 be parallel with the axis 27 of untilted reel 1. The second condition also illustrated is that the projections of the tape paths, one path from the tilted reel 3 to tilted idler pulley 18 and the other from untilted reel 1 to idler pulley 20, intersect in a vertical plane passing through the line of contact of the tape 5 and idler pulley 18. These two conditions, when met, insure a minimum of side pressure of the tape against the two idlers and hence a minimum of wear on the idlers as well as the edges of the tape. A third condition is that the two orienting idlers must be located adjacent to the point where tape enters and leaves the tilted reel so that the path through the vacuum chambers and over the record/reproduce head is parallel with the backplate of the tape handler.

Figure 5:
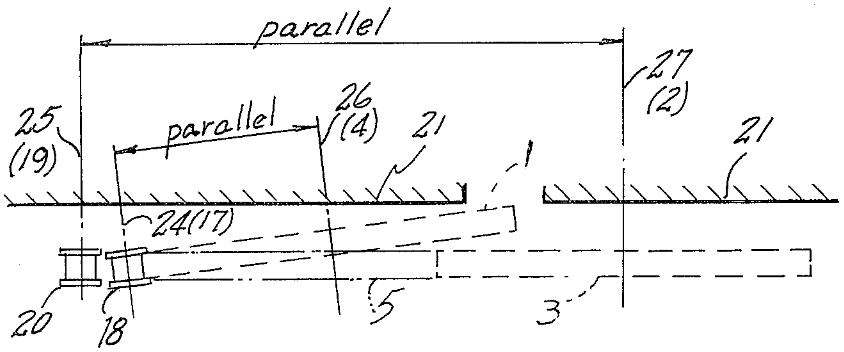
FIG. 5 is a simplified illustration showing the orientation of the reels in the preferred form of the present invention.
Figure 6:
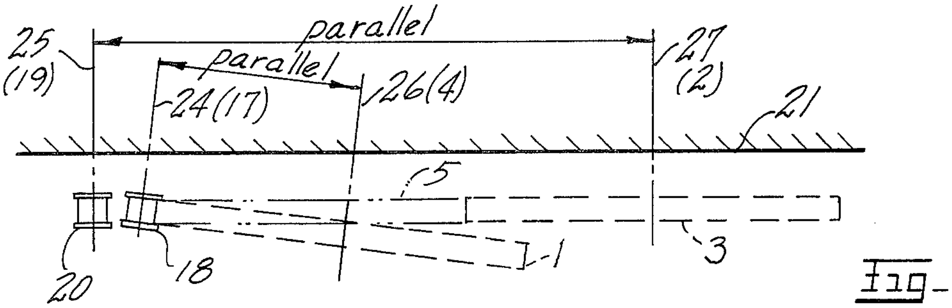
FIGS. 6 and 7 are simplified illustrations of two further possible orientations of the reels in accordance with the present invention.
Figure 7:
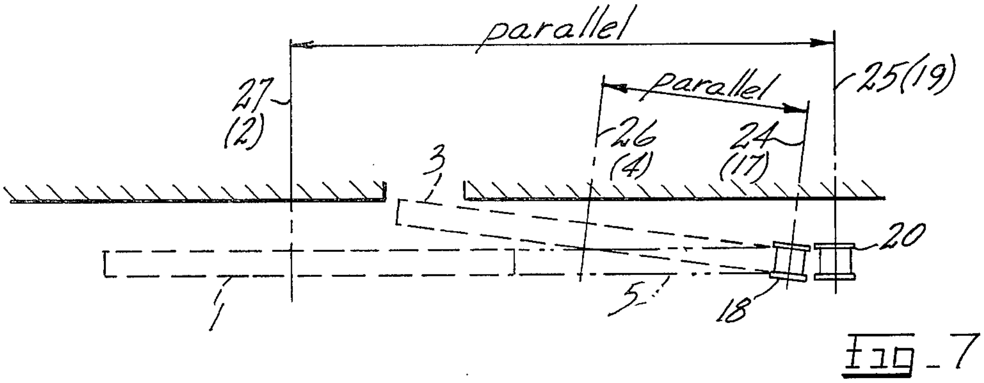

FIGS. 5, 6, and 7 show three possible variations of the present invention. In keeping with FIG. 3, and for purposes of description, reel 1 may be taken as the take-up reel and reel 3 as the supply reel. Idler 18 in each case is the tilted idler, i.e., the one having its axis parallel with the axis of the tilted reel and idler 20 is the orienting idler having its axis parallel with the reel mounted parallel with the backplate of the tape handler.

In FIG. 5 the supply reel 3 is parallel with the backplate and on the outside of the tilted take-up reel 1. In equipment having the supply reel on the right side, this is the preferred form of the present invention since it accomplishes the purposes of the invention without providing an unfamiliar orientation of the supply reel, the reel handled most in the operation of a magnetic tape handler.

In FIG. 6 the supply reel 3 is mounted parallel with the backplate 21 while the take-up reel 1 overlaps and is tilted. Orienting idlers 18 and 20 receive tape from idler reel 1 and orient it parallel with the backplate for travel through the vacuum tanks, over the record/reproduce head to the supply reel 3 or the inverse for tape travel from supply reel 3 to take-up reel 1.

In FIG. 7 the take-up reel 1 is mounted parallel with the backplate while the supply reel 3 is tilted. Orienting idlers 18 and 20 are mounted adjacent to the entrance/exit point of the tilted reel 3. If the reels were interchanged in function so that the supply reel, the parallel mounted reel, was on the left side, this would be the preferred form of the present invention.

Figure 8:
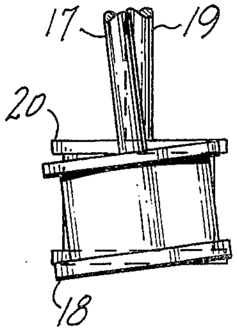
FIG. 8 is an enlarged pictorial illustration of the two orienting idlers.

FIG. 8 is a pictorial illustration of the two orienting idlers 18 and 20 as viewed from above.

I claim:

1. In a magnetic tape handler, the combination of;

a servo motor driven magnetic tape first reel mounted on a plate with its axis perpendicular to said plate;

a servo motor driven magnetic tape second reel mounted on said plate with its axis disposed with respect to the axis of said first reel at a distance therefrom of between 25 and 50 percent less than the diameter of said reels and tilted with respect to said first reel whereby said second reel substantially overlaps said first reel;

a motor driven capstan and read/write head mounted along the tape path between said two reels and oriented in accordance with the position of said first reel;

and two idler pulleys mounted adjacent to said second reel, one oriented in accordance with said second reel and the other oriented in accordance with said first reel for redirecting the tape as it is passed from one of said reels to the other.

2. A magnetic tape handler as set forth in claim 1, and wherein;

said idler pulleys are located at the same distance from said vertical plate as said first reel.

3. A magnetic tape handler as set forth in claim 1, and wherein;

the axis of one of said idler pulleys is parallel with the axis of said second reel and the axis of the other of said idler pulleys is parallel with the axis of said first reel.

4. In a magnetic tape handler, the combination of;

a servo motor driven magnetic tape first reel mounted on a plate with its axis perpendicular to said plate;

a servo motor driven magnetic tape second reel mounted on said plate with its axis disposed at a distance of substantially less than the diameter of said reels and tilted with respect to said first reel;

a motor driven capstan for moving said tape across a read/write head all mounted along the tape path between said two reels and oriented in accordance with the position of said first reel;

and two idler pulleys mounted adjacent to said second reel, one oriented to direct the tape to and from said second reel and the other oriented to direct the tape to and from the read/write head and capstan.

5. A magnetic tape handler as set forth in claim 1, and wherein;

said first reel is the take-up reel and said second reel is the supply reel.

6. A magnetic tape handler as set forth in claim 1, and wherein;

said first reel is the supply reel and said second reel is the take-up reel.

7. In a magnetic tape handler, the combination of;

a servo motor driven magnetic tape first reel mounted on a plate with its axis perpendicular to said plate;

a servo motor driven magnetic tape second reel mounted on said plate with its axis disposed at an angle with respect to the axis of said first reel at a distance therefrom of between 25 and 50 percent less than the diameter of said reels whereby said second reel substantially underlaps said first reel;

a motor driven capstan and read/write head mounted along the tape path between said reels;

and means for orienting the tape to enter or leave each of said reels along the same plane as the tape on the respective reels.

* * * * *